Dec. 29, 1964     R. D. COLLINS     3,163,580
FIRE DETECTION IN GRAPHITE MODERATED, $CO_2$ COOLED REACTOR
Filed Jan. 28, 1960
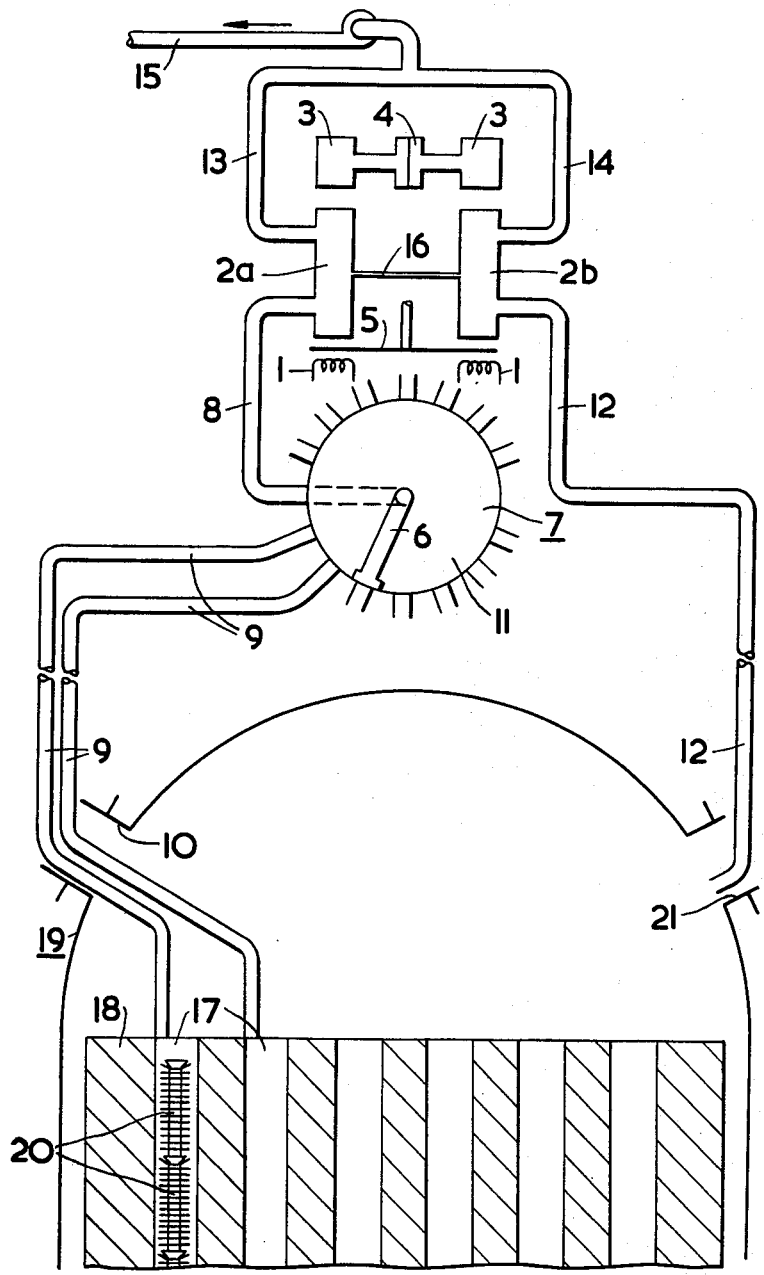
INVENTOR
ROBERT DORRELL COLLINS
By: ATTORNEYS

United States Patent Office 3,163,580
Patented Dec. 29, 1964

3,163,580
FIRE DETECTION IN GRAPHITE MODERATED, CO₂ COOLED REACTOR
Robert D. Collins, Seascale, Cumberland, England, assignor to United Kingdom Atomic Energy Authority, London, England
Filed Jan. 28, 1960, Ser. No. 5,144
3 Claims. (Cl. 176—19)

This invention relates to nuclear reactors.

In a reactor using carbon dioxide as a coolant combustion of parts of the core structure of the reactor may occur if, for any reason, temperatures rise to a high enough level. As carbon dioxide is in excess carbon monoxide will be among the combustion products and its measurement provides a method of detecting the onset of a fire and following its progress. This measurement, however, is complicated by the presence in the carbon dioxide coolant of carbon monoxide (say a few thousand p.p.m.) consequent upon normal operation of the reactor or specially provided for its inhibiting properties and it is accordingly an object of the invention to provide means for detecting the presence of carbon monoxide created by combustion in a nuclear reactor cooled by carbon dioxide including a few thousand p.p.m. of carbon monoxide.

According to the present invention a carbon dioxide cooled reactor of the kind having a moderator penetrated by channels charged with fuel elements is provided with means for comparing the general carbon monoxide content of the coolant with the carbon monoxide content of coolant emerging from selected channels.

In one way of carrying the invention into effect samples are taken representative of the general coolant and of the coolant at the outlet of the fuel element channel or channels being monitored for carbon monoxide content and the carbon monoxide content of the general and outlet samples are compared in an infra-red gas analyzer whose principle of operation is to compare the selective absorption of infra-red radiations in a reference and a sample tube. It is possible to use the same sampling pipes for carbon monoxide monitoring as are used for detecting burst fuel elements by monitoring the coolant for the presence of fission products (see for example British Patent No. 814,416). The general coolant sample will be typical of coolant at the inlet of the selected fuel element channels and hence an increase in carbon monoxide content may be detected in and pin-pointed to a particular channel.

An embodiment of the invention will now be described by way of example with reference to the accompanying drawing which is diagrammatic.

In the drawing is shown an infra-red gas analyzer having two infra-red radiation sources 1 from which radiations pass through two tubes 2a, 2b containing the gases to be compared into a pair of detection chambers 3 containing pure carbon monoxide. The chambers 3 are connected to opposite sides of a diaphragm 4 which forms one plate of a condenser. A shutter 5 is provided to chop the radiation beams from the sources 1 simultaneously. The tube 2a is connected to the arm 6 of a rotary selector valve 7 by a pipe 8. The arm 6 sniffs in turn at each of a number of pipes 9 which connect through a duct 10 with fuel element channels 17 penetrating a moderator 18 in a reactor vessel 19. The fuel element channels 17 are charged with fuel elements 20. The pipes 9 each carry samples of gas from an individual fuel element channel 17 or from a small group of such channels. Whilst the arm 6 covers a pipe 9 a gas sample is fed into the tube 2a. At other times each pipe 9 feeds continuously into the body 11 of the valve 7. A pipe 12 leads from a main coolant outlet duct 21 of the reactor vessel 19 to the tube 2b to provide a general sample of coolant. The tubes 2a, 2b are connected by a pressure balancing bleed pipe 16 and are provided with outlets 13, 14 respectively. The outlets 13, 14 join in a pipe 15 which returns gas to the reactor.

The radiations in the absorption spectrum of carbon monoxide passing through the chambers 3 heat the carbon monoxide in the chambers raising its pressure. The remaining radiations are absorbed in the chamber walls. In operation the radiation beams are arranged to be equal when the gas in the two tubes 2 is the same so that the pressure on each side of the diaphragm 4 is then equal also. Chopping of the radiations beams by the shutter 5 will, however, result in pressure pulses on the two sides of the diaphragm 4 and these pulses will be equal so long as the gas in the two tubes 2 is identical. Introduction of more carbon monoxide into one of the tubes 2 reduces the radiations in the absorption spectrum of carbon monoxide in the chopped beam reaching the corresponding chamber 3, the heating effect of the beam is less and oscilloation of the diaphragm results. This oscillation is detected electronically and can be correlated with the relative changes in carbon monoxide content in the tubes 2a, 2b.

By means of the invention it is possible to detect differences of about 80 p.p.m. between the sample in the tube 2a and the general coolant in the tube 2b when the general coolant contains 6,000 p.p.m. of carbon monoxide. It is calculated that such a difference would be brought about by a 3 kw. fire in a channel of a Calder type reactor operating at full load.

Every fuel element channel in a reactor may be monitored by means of the invention, several infra-red gas analyzers being used simultaneously.

I claim:

1. A method for detecting a fire in a carbon dioxide cooled reactor having a graphite moderator penetrated by channels charged with fuel elements, comprising collecting a first sample of coolant from the coolant stream emerging from a selected channel in said moderator, and collecting a second sample of coolant to be used as a comparison standard from a mixture of the coolant emerging from substantially all of said channels, and comparing said first and second samples in a comparison type gas analyzer to detect the presence in the first sample of carbon monoxide caused by combustion.

2. The method of claim 1 wherein the first sample is analyzed in an infra-red gas analyzer using said second sample as the comparison standard in the analyzer.

3. A method for detecting a fire in a reactor having a graphite moderator penetrated by channels charged with fuel elements and cooled by a carbon dioxide coolant including varying amounts of carbon monoxide, comprising collecting a first sample of coolant from the coolant stream emerging from at least one selected channel, collecting a second sample of coolant to be used as a comparison standard from a mixture of the coolant which flows through substantially all of said channels, and comparing said first and second samples in a comparison type gas analyzer to detect the presence in the first sample of carbon monoxide caused by combustion.

References Cited in the file of this patent

"Proceedings of the Second United Nations International Conf. on the Peaceful Uses of Atomic Energy," September 1958, vol. 7, pp. 335–337, 348–350, 357–362.

The Analyst, vol. 83 (November 1958), p. 600.

Nucleonics, vol. 14 (December 1956), pp. S20 and S21.

Nuclear Power, vol. 3 (No. 24, April 1958), p. 155, (part of article by Sandiford).